United States Patent
Auerbach et al.

(10) Patent No.: US 9,424,010 B2
(45) Date of Patent: Aug. 23, 2016

(54) EXTRACTION OF FUNCTIONAL SEMANTICS AND ISOLATED DATAFLOW FROM IMPERATIVE OBJECT ORIENTED LANGUAGES

(75) Inventors: Joshua S. Auerbach, Ridgefield, CT (US); David F. Bacon, Sleepy Hollow, NY (US); Perry S. Cheng, Cambridge, MA (US); Rodric Rabbah, Yonkers, NY (US)

(73) Assignee: International Business Machines Corporation, Armonk, NY (US)

( * ) Notice: Subject to any disclaimer, the term of this patent is extended or adjusted under 35 U.S.C. 154(b) by 499 days.

(21) Appl. No.: 12/870,980

(22) Filed: Aug. 30, 2010

(65) Prior Publication Data

US 2012/0054718 A1    Mar. 1, 2012

(51) Int. Cl.
*G06F 9/44* (2006.01)
*G06F 9/45* (2006.01)

(52) U.S. Cl.
CPC ............... *G06F 8/436* (2013.01); *G06F 8/314* (2013.01); *G06F 8/447* (2013.01); *G06F 8/456* (2013.01)

(58) Field of Classification Search
None
See application file for complete search history.

(56) References Cited

U.S. PATENT DOCUMENTS

| | | | | |
|---|---|---|---|---|
| 5,412,784 A | * | 5/1995 | Rechtschaffen et al. | 712/245 |
| 5,903,466 A | * | 5/1999 | Beausang | G01R 31/31704 716/104 |
| 5,937,192 A | * | 8/1999 | Martin | G06F 8/451 707/999.01 |
| 5,999,729 A | * | 12/1999 | Tabloski et al. | 717/105 |
| 6,077,315 A | * | 6/2000 | Greenbaum et al. | 717/157 |
| 6,243,863 B1 | * | 6/2001 | Kothari et al. | 717/149 |
| 6,311,265 B1 | * | 10/2001 | Beckerle et al. | 712/203 |
| 6,330,717 B1 | * | 12/2001 | Raverdy et al. | 717/170 |
| 6,507,947 B1 | * | 1/2003 | Schreiber | G06F 17/5045 717/159 |
| 6,598,112 B1 | * | 7/2003 | Jordan et al. | 711/2 |
| 6,651,186 B1 | * | 11/2003 | Schwabe | 714/38.14 |
| 6,651,240 B1 | * | 11/2003 | Yamamoto et al. | 717/108 |
| 6,687,760 B1 | * | 2/2004 | Bracha | 719/310 |
| 6,745,384 B1 | * | 6/2004 | Biggerstaff | G06F 8/4441 712/203 |

(Continued)

FOREIGN PATENT DOCUMENTS

WO    WO 2007/085855    8/2007

OTHER PUBLICATIONS

Juan Soulie, "C++ Language Tutorial", cplusplus.com, 2008, <http://www.cplusplus.com/files/tutorial.pdf> pp. 1-72.*

(Continued)

*Primary Examiner* — Thuy Dao
(74) *Attorney, Agent, or Firm* — Scully, Scott, Murphy & Presser, P.C.; Louis J. Percello, Esq.

(57) ABSTRACT

Extraction of functional semantics and isolated dataflow from imperative object oriented languages, in one aspect, may include identifying one or more methods and/or classes associated with one or more of a plurality of property labels in a computer code written in object oriented language to extract functional and isolation characteristics in the computer code. The plurality of property labels supported by one or more checking rules, are used to verify that the one or more methods and/or classes identified with the plurality of property labels have isolation characteristics. An object oriented language compiler is provided for supplying the plurality of property labels and checking rules. The object oriented language compiler further may include capability to transform methods into compute tasks and connect the compute tasks so as to create a dataflow graph.

8 Claims, 4 Drawing Sheets

(56) References Cited

U.S. PATENT DOCUMENTS

| | | | |
|---|---|---|---|
| 6,856,995 B1* | 2/2005 | Ibitayo et al. | 717/116 |
| 6,981,250 B1* | 12/2005 | Wiltamuth et al. | 717/170 |
| 7,051,322 B2* | 5/2006 | Rioux | 717/143 |
| 7,574,692 B2 | 8/2009 | Herscu | |
| 7,756,801 B2 | 7/2010 | Reich et al. | |
| 7,797,691 B2* | 9/2010 | Cockx et al. | 717/155 |
| 7,873,951 B1* | 1/2011 | Bissett et al. | 717/151 |
| 8,001,421 B2* | 8/2011 | Wang | G06F 9/3863 714/19 |
| 2002/0046230 A1* | 4/2002 | Dieterich et al. | 709/107 |
| 2002/0129340 A1* | 9/2002 | Tuttle | G06F 17/30867 717/132 |
| 2002/0133788 A1* | 9/2002 | Waters | G06F 8/44 716/103 |
| 2002/0138819 A1* | 9/2002 | Hills | 717/114 |
| 2004/0006765 A1* | 1/2004 | Goldman | 717/116 |
| 2004/0078779 A1 | 4/2004 | Dutt et al. | |
| 2004/0088689 A1* | 5/2004 | Hammes | 717/154 |
| 2005/0066317 A1 | 3/2005 | Alda et al. | |
| 2005/0177817 A1* | 8/2005 | Arcaro et al. | 717/108 |
| 2005/0188364 A1* | 8/2005 | Cockx et al. | 717/159 |
| 2006/0041872 A1 | 2/2006 | Poznanovic et al. | |
| 2006/0143596 A1 | 6/2006 | Miyashita et al. | |
| 2006/0195827 A1* | 8/2006 | Rhine | 717/140 |
| 2006/0225053 A1 | 10/2006 | Lakshman et al. | |
| 2007/0003161 A1* | 1/2007 | Liao | G06F 8/456 382/276 |
| 2007/0006138 A1* | 1/2007 | Ahe et al. | 717/106 |
| 2007/0022412 A1* | 1/2007 | Tirumalai et al. | 717/140 |
| 2007/0033659 A1* | 2/2007 | Hoche et al. | 726/28 |
| 2007/0169054 A1* | 7/2007 | Cheng et al. | 717/156 |
| 2008/0178149 A1 | 7/2008 | Peterson et al. | |
| 2009/0217248 A1 | 8/2009 | Bently et al. | |
| 2010/0153937 A1* | 6/2010 | Richards et al. | 717/149 |
| 2011/0047534 A1 | 2/2011 | Ye et al. | |
| 2011/0055783 A1* | 3/2011 | Yang | H01L 27/0207 716/122 |
| 2011/0131559 A1* | 6/2011 | Young | G06F 8/314 717/145 |
| 2011/0307897 A1 | 12/2011 | Atterbury et al. | |
| 2012/0044042 A1* | 2/2012 | Chan | G05B 15/02 340/3.3 |
| 2012/0054718 A1* | 3/2012 | Auerbach et al. | 717/116 |
| 2014/0075423 A1 | 3/2014 | Kielstra | |
| 2014/0075424 A1 | 3/2014 | Kielstra | |
| 2015/0363175 A1* | 12/2015 | Klausner | G06F 8/34 717/109 |

OTHER PUBLICATIONS

Bill Venners, "Composition and Inheritance", Artima Developer, 2001, <http://www.artima.com/objectsandjava/webuscript/CompoInherit1.html>, pp. 1-20.*

"Can Java constructor has private or protected access type?", Career Cup, 2010 <http://www.careercup.com/question?id=296844>, pp. 1-9.*

William Thies et al., "An Empirical Characterization of Stream Programs and its Implications for Language and Compiler Design", ACM, 2010, <http://groups.csail.mit.edu/commit/papers/2010/thies-pact10.pdf>, pp. 1-12.*

Suresh Jagananthan, "Weaving Atomicity Through Dynamic Dependence Tracking", IEEE, 2007, <http://ieeexplore.ieee.org/stamp/stamp.jsp?tp=&arnumber=4228225>, pp. 1-7.*

Jong-Yoel Lee et al. "Timed Compiled-Code Simulation of Embedded Software for Performance Analysis of SOC Design", ACM, 2002, <http://delivery.acm.org/10.1145/520000/513994/p293-lee.pdf>, pp. 1-6.*

Chao et al., Denotational Data Flow Analysis for Parallel Implementation of Imperative Programs, ACM, Jan. 1, 1988, pp. 17-26.

Anonymous, Digital High Performance Fortran 90, HPF and PSE Manual, Digital Equipment Corporation, Jan. 1, 1997, pp. 1-6, http://www.mun.ca/hpc/hpf_pse/maual/h.

International Search Report and Written Opinion mailed Dec. 8, 2011 in corresponding International Application No. PCT/EP2011/063634 from the European Patent Office.

Notice of Allowance dated Mar. 31, 2015 received in U.S. Appl. No. 13/925,083.

Office Action dated Nov. 20, 2014 received in U.S. Appl. No. 13/925,083.

Office Action dated Oct. 23, 2014 received in U.S. Appl. No. 13/605,773.

Office Action dated Jan. 5, 2016 received in U.S. Appl. No. 14/707,235, pp. 1-31.

* cited by examiner

EXTRACTION OF FUNCTIONAL SEMANTICS AND ISOLATED DATAFLOW FROM IMPERATIVE OBJECT ORIENTED LANGUAGES

FIELD

The present application generally relates to computer programming languages and parallel programming, and more particularly to extracting functional semantics and isolated dataflow from statically checked imperative object oriented languages such as Java, C++, C#, or others.

BACKGROUND

The vast majority of practical programming languages used by programmers today are imperative (meaning that, for the most part, computations can have arbitrary side-effects and are not isolated). As a consequence, compilers are inhibited from applying optimizations that can achieve the best performance in the newest hardware. For example, a compiler may be inhibited from reordering operations, or arranging for pipelined or parallel execution when multiple processors are available since such rearrangement is invalid in the presence of arbitrary side-effects.

Many such programming languages are also object oriented (OO). A consequence of object orientation is that a call/return sequence (method call) executed at a particular program point can potentially invoke one of many different code bodies (methods) with different characteristics, making it even more difficult to determine what side-effects might occur.

There is a good reason why imperative OO languages are overwhelmingly more popular than functional and dataflow languages: many things that programs need to do are inherently imperative (side-effecting) and it is often difficult or even impossible to express an entire application in a strictly functional style. However, with such programming languages, it is difficult or impossible to express that portions of a program are intended to be side-effect free. Thus, there is no way for the programmer to cooperate with the compiler to achieve parallel or pipelined execution.

With current state of the art, classifying of methods into those that are pure functions, those that are stateful but isolated (receiving new information only as arguments and providing results only as return values), and those that have arbitrary side-effects is difficult and may be inefficient. For example, to do this directly (for instance, by adding a "pure" and or "isolated" keyword to the language) would lead to complicated and non-modular method checking. All of the method actions would need to be analyzed in context (i.e., what is it doing and what object is it doing it to). To ensure that a method is stateful but isolated is similarly difficult since one must enable one large class of accesses while disabling another large class which will break isolation.

BRIEF SUMMARY

A method and system for extracting functional semantics and isolated dataflow from imperative object oriented languages may be provided. The method, in one aspect, may include identifying one or more methods and classes associated with one or more of a plurality of property labels in a computer code written in object oriented language to extract functional and isolation characteristics in the computer code. The plurality of property labels may be supported by one or more checking rules. The method also may include applying the one or more checking rules to verify that the one or more methods identified with the plurality of property labels have isolation characteristics.

A system for extracting functional semantics and isolated dataflow from imperative object oriented languages, in one aspect, may include an object oriented programming language module including at least a plurality of property labels for labeling functional and isolation characteristics of one or more methods and classes in a computer code. The object oriented programming language module further may include at least one or more checking rules supporting the plurality of property labels.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

The information most relevant to the compiler would be a classification of all methods into those that are pure functions, those that are stateful but isolated (receiving new information only as arguments and providing results only as return values), and those that have arbitrary side-effects. For modular compilation and efficient implementation, this classification should be decidable by examining a single method at a time. A compiler will typically build structures (such as a call-graph showing what methods may be invoked by a particular statement or an inheritance graph describing subclass and superclass relationships) and then try to decide side-effect issues by examining large numbers of methods. This can be expensive and, if not all the program code is present at the time of compilation, the answer may be that it is unknown and worst-case assumptions must be made. The system and method of the present disclosure in one embodiment may avoid all of this overhead and excessive conservatism.

The present disclosure in one aspect provides a set of semantics (e.g., object types and methods) to an object oriented (OO) programming language for aiding parallelism or parallel programming. In another aspect, a process in one embodiment is disclosed for starting with an existing OO language, then adding property labels to methods and classes which are supported by a set of checking rules which verify the extraction of functional and isolation characteristics of methods. The terminologies "class", "subclass", "method" (class method), and "override" are used herein as they are understood and used in object oriented programming languages. Further it should be understood that compilers for statically typed object oriented programming languages typically assign types to expressions and perform checks using that information.

A method is functional if its execution has no detectable effects other than the provision of explicit results, that is, the execution has no side-effects. A method is isolated if its side-effects, if any, are limited to modifying or consulting a set of object instance variables that are accessible to it during its execution but not accessible to any other portion of the program. All functional methods are isolated but not all isolated methods are functional. The process also may add operators to the language for turning isolated methods into compute nodes (tasks) and connecting them into a dataflow graph. A dataflow graph is a structure that can be executed as part of the program when the program runs, such that the compute nodes communicate only with other compute nodes in the graph, and only via explicit channels connecting them. The result in one aspect is a dataflow graph representation of the affected part of the program that is isolated (e.g., as in the dataflow model) and has each node (task) clearly labeled as to whether it is (internally) stateful or side-effect free (e.g., functional). As a result, the more readily parallelizable and pipelined models may be produced coupled with programmer familiarity and the broader expressivity of an imperative OO language.

The computer language of the present disclosure substantially simplifies and modularizes the required checking for both pure functions and stateful isolated methods by decomposing both of these properties into two simpler properties, valueness and localness, as will now be explained. Two different compositions of valueness and localness yield the desired purity and isolation properties as explained below.

In one embodiment, a method and/or system of the present disclosure labels all classes of the OO language as either values or references (hereafter called the class's "valueness" property). It labels all methods of the OO language as either local or global (hereafter called the method's "localness" property).

Optionally, some classes may be labeled as "universal" (neither values nor references) and some methods may be labeled as "glocal" (neither local nor global). These additional options increase the convenience for OO programming or increase efficiency as will be explained. However, the methodology of the present disclosure can be applied with or without these extensions. The extensions are discussed in more detail in the sections on enforcement of the valueness and localness properties.

If a class is labeled as a value, the compiler for the language of the present disclosure ensures that its instances cannot be modified once created and have no object identity (they cannot be null, and equality comparisons are based on their contents rather than their addresses). A class labeled as a reference behaves as is usual in an OO language (its instances can be modified, can be null, and equality comparisons are based on addresses). In a language like Java™ that has primitive types, the primitive types are treated as if they are value classes.

A local method may not access global state reached through static variables except when such state is "repeatable" (can be recomputed at will and consists entirely of values). A global method has no such restriction.

Each of these properties (valueness for classes and localness for methods) is independently and locally checkable. That means that (1) it is not necessary to inspect more than a class at a time or a method at a time and (2) the properties are stable when a subclass is substituted for a class, as is permitted in OO Languages: a method call that appears to be a local method will always be to a local method because the checking rules preclude a new subclass being defined that would violate this later.

Localness and valueness are readily composed to decide which methods are pure functions. A static method or an instance method of a value class that is local and has only value arguments is necessarily a pure function.

The system and/or method of the present disclosure in one embodiment also may provide a task operator for turning methods into compute nodes (tasks) in a dataflow graph. Localness and valueness are readily composed with each other and the design of the task operator to ensure task isolation—namely, that the computation inside of the task operates on mutable state that is disjoint from the rest of the program. An instance method is isolated if it is a pure function. An instance method M of object instance O is also isolated (even though not a pure function) if these criteria are met:

(1) M is a local method with only value arguments and a value return type;
(2) O was constructed with a constructor that is local and has only value arguments;
(3) No aliases exist to O.

The task operator ensures that conditions (2) and (3) are met, since the task operator performs the construction of the object atomically with the creation of the task. It does not return a reference to the created object, but rather to an opaque "handle" which admits a limited number of task operations but not direct object access.

Valueness Enforcement

To ensure that values have the necessary properties, the compiler enforces the following restrictions; violations are errors and a programmer may correct those errors.

1. Fields of a value class are themselves instances of value classes. In other words, valueness is a "deep" property.
2. Fields of a value may not be modified. To enforce this, the compiler checks all instructions that modify fields to ensure that the field being modified is not a field of a value class. Where an existing property (such as Java's "final" property) exists in the OO language, it is sufficient to turn on that property for every field of a value, since the compiler is checking this property already.
3. Since a value may not be null, each value class has a constructor that takes no arguments and creates a "default instance" to which value fields will be initialized in lieu of null. The compiler changes the default initialization of fields of value type (in all objects, not just in values) to use this default constructor instead of assigning null.
4. A reference class may not be declared as a subclass of a value class. Otherwise, the usual rules of an OO language, allowing a subclass to be substituted for the original class, could cause the valueness property to be violated.
5. Whenever a non-value class may have subclasses that are value classes (the converse of the previous), the compiler inserts dynamic checks on all expressions of that non-value type to ensure that the value rules are not violated in the event that a value was substituted.

Because dynamic checks are expensive (rule 5), it is a useful optimization not to have to insert them in too many places. That is where the ability to label some classes as universal becomes useful. If universal classes are added to the design, these additional rules are added.

1. Universal classes behave like value classes in that their fields are immutable and are values.
2. Universal classes, however, may be null.
3. Universal classes are like reference classes in that that they cannot be declared as subclasses of value classes.
4. Value classes may be declared as subclasses of universal classes but not as subclasses of reference classes. This means that the compiler only needs to insert dynamic checks for expressions of universal type.

Localness Enforcement

Based on programmer labeling, every method and constructor is classified as global or local (or, optionally, glocal, which is described in a separate set of rules below). The compiler then enforces the following restrictions; violations are errors and the programmer corrects those errors. Hereafter, "method" means "method or constructor."

1. In a local method, no stores may be made to static fields.
2. In a local method, static fields may not be read unless they are "repeatable" (definition given below).
3. A local method may not call a global method. Note that in most OO languages, a constructor is implicitly called every time a new object is created. These implicit calls are subject to this check.
4. A global method may not override a local method in the OO inheritance hierarchy.
5. A local method may not do things that affect or are affected by the environment, such as I/O, setting or interrogating the time of day, or actions that affect or depend upon the thread schedule. In a language like Java™ where almost all such operations are performed by calling methods, it is sufficient to label all environment-sensitive methods as global, including all synchronized methods and methods such as "wait" and "notify" (since calling global methods is already illegal). This leaves only the Java "synchronized" statement (which is also illegal in a local method).

The idea behind repeatable static fields is that the compiler can replace the reading of such fields with an alternative expression that is guaranteed to produce the same result as reading the field. The rules for achieving this property are as follows.

1. The field is protected from modification (for example, by Java's "final" property or some similar property).
2. The field is of value type.
3. The field's initialization expression is readily accessible to the compiler (for example, by being written out as part of the declaration).
4. That initialization expression follows rules consistent with a local method, in terms of how other static fields are accessed, how the environment is handled, and in not calling global methods.
5. The field's initialization expression may not refer to itself (directly, or indirectly via references to other fields). Otherwise, the result might differ depending on the order of evaluation of the interrelated fields.

The previous rules may not be sufficient to ensure repeatability if it is possible for local methods to behave non-deterministically. In a language like Java™, where all non-determinism comes from sources that are already prohibited in local methods (like I/O or synchronization) this does not happen. But, in other languages, which have explicitly non-deterministic operators built in, either the use of those operators in local methods is prohibited or a subset of explicitly deterministic local methods might have to be distinguished and only those may be called in repeatable field initializations.

The basic rules for localness enforcement are simple but in a complex OO development context they may be too inflexible. In designing a method so that it can be called in the most possible places, one would want it to be local but in designing it so that it can be overridden with the fewest restrictions in subclasses one would want it to be global. The optional "glocal" label for methods addresses this issue. If glocal methods are employed then the rules for checking are augmented as follows.

1. Glocal methods are subject to the same rules as local methods in their access to static fields for both reading and writing.
2. Glocal methods are subject to the same prohibitions as local methods in affecting the environment through I/O or the thread schedule.
3. Glocal methods are added to the rule on inheritance as forming an intermediate level of restrictiveness between local (most restrictive) and global (least restrictive) and the inheritance rule is now restated more generally to say that a less restrictive method may not override a more restrictive method.
4. The rule on what methods may call what other methods is enriched to take into account the concepts of a localizable expression or call and a localizing call as we now will define; the revised calling rules are stated after the necessary definitions.

The basic idea behind the enriched definitions and rules is to define methods that might behave as local when called with the right kind of arguments but that are not required to always behave as local, allowing them to call global methods under some circumstances.

As background to these definitions, it is useful to note that many (but not all) OO languages permit type parameters. A class or method that is declared with type parameters stands for a whole group of classes or methods based on what classes are substituted for those type parameters when using the class or method. For example, there might be a class that implements a list of things, where a type parameter "T" tells what kind of thing the list will list. By substituting the class "String" for "T" one gets a list of strings and by substituting the class "Number" one gets a list of numbers. The actual class that is substituted for each type parameter is called a type argument.

Definition: a localizable expression is a simple reference by name to one of the parameters of a method or else an expression whose class is determined by a type parameter. In a language without type parameters, the second part of the definition is ignored.

The idea behind an expression being localizable is that, inside a glocal method, such an expression might sometimes denote one class and sometimes another, depending on how the method was invoked and perhaps what type arguments have been substituted.

Definition: a localizable call is a method call whose receiver, firstly, is a localizable expression (by "receiver" we mean the object to which the call is directed; for example, in the Java expression "x.add( )", the receiver is "x"). Secondly, the method that is called, is capable of being overridden according to the rules of the OO language (for example, in Java™, it may not be a "final" method).

The idea behind a call being localizable is that such calls could be allowed inside a glocal method even if the method being called is not always local if, under the right set of circumstances, the compiler can establish that the localizable expression has been replaced using a class in which in which all callable methods are, in fact, local.

Definition: a localizing call is a call to a glocal method in which all of the arguments to the methods (substituting for the method's parameters) and all of the type arguments, if any (substituting for the relevant type parameters), are ones in which all of the methods that could possibly be invoked through those arguments or type arguments are local.

Given these definitions, we then have these modified rules for when one kind of method can invoke another.
1. Except as relaxed by the other two rules, glocal methods can only be invoked by global methods and can only invoke local methods.
2. (Exception to 1) Inside a local or glocal method, the invocation of a glocal method is allowed if the call is localizing. Inside a glocal method, in deciding whether a call is localizing, it can be assumed that all localizable expressions have already been replaced such that only local calls are possible through them.
3. (Exception to 1) Inside a glocal method, the invocation of a glocal or global method is allowed if the call is localizable.

Realization of Valueness in a Language Extension to Java

The methodology of the present disclosure in one aspect may provide convenient ways to expose many levels of parallelism and enable, encourage, and simplify the use of language constructs that can be used to generate the kinds of static structures required when compiling to hardware. The latter is particularly difficult in Java™-like languages which tend to have the opposite goal.

This section shows in greater detail how valueness can be added to the Java™ language (a typical statically typed OO language). The specific examples are drawn from the Lime language which will be described in the paper "Lime: A Java-Compatible and Synthesizable Language for Heterogeneous Architectures" to be published in the proceedings of OOPSLA 2010 in October, 2010, which paper is incorporated herein by reference in its entirety.

In Lime, the properties "value" and "universal" are made into keywords which can be added as modifiers when declaring a class or interface. In the absence of such a keyword, the class or interface is assumed to be a reference, except for the eight primitive types of Java™ which are assumed to be values. For the resulting inheritance hierarchy to be correct, the class "java.lang.Object", which is the root of the inheritance hierarchy, is declared to be universal. This works because that class has no fields, thus it is easy for it to conform to the rules for universal classes.

Java™ has array types and all Java™ arrays have modifiable elements, thus some additional language mechanism is needed to establish a class of value arrays whose elements are not modifiable. This is shown below.

Once a language has value types, it can enable hardware-sensitive programming, for example, defining numbers with a specific bit width (shown in Example 1 below). This in turn strongly encourages other supporting features such as user-defined operators and typedefs, also discussed below.

In addition, Lime has the more specific goal of generating static data structures that can go directly into hardware; this requires that some arrays have sizes that are known at compile time. This in turn induces other language features (for indexing the bounded arrays). We present these additional features to illustrate how the features that depend directly on the present disclosure can readily be combined with other features that may be outside the present disclosure but synergistic with it to achieve specific goals.

Many fundamental language features are shown in following Example Code 1, which illustrates a partial and simplified implementation of the built-in type for unsigned arbitrary bit-width integers.

Example Code 1

```
1  public final value class
2  unsigned<N extends ordinal<N>> {
3      private bit[[N]] data;
4      public unsigned( ) {
5          this.data = new bit[[N]];
6      }
7      public unsigned(bit[N] data) {
8          this.data = new bit[[N]](data);
9      }
10     public unsigned<N> this & unsigned<N> that {
11         var result = new bit[N];
12         for (N i: N.first::N.last)
13             result[i] = this.data[i] & that.data[i];
14         return new unsigned<N>(result);
15     }
16     ...
17 }
18 public typedef uint = unsigned<enum<32>>;
```

An unsigned number is defined as a fixed size array of bits, and each operation is then defined as a function on those bit arrays. Since much of the computation and parallelism available in hardware occurs at the bit-level, the methodology of the present disclosure may provide constructs for exposing such operations, and yet maintain a high level of abstraction. Thus the ability to compute at the bit-level is combined with the ability to define what in almost every other language are included as "primitive" types.

Some Observations about Value Types

Note that value types in this example (and in more general terms in the earlier description) are in contrast to the "struct" value types of C#, whose fields are immutable but may point to mutable objects.

Deeply immutable objects provide a host of beneficial mathematical properties. For instance, for compilation to hardware, value classes of the present disclosure can be freely moved across a chip as a chunk of bits, without requiring any remote accesses.

The methodology of the present disclosure also pushes OO language such as Java™ toward a more functional style. Value types provide a "micro-functional" portion of the language. Streaming computation described below provides the "macro-functional" portion of the language.

The value keyword is illustrated by line 1 of above shown Example Code 1. All fields of a value class are implicitly final, and are themselves value classes. A default constructor is either defined explicitly via a zero argument constructor or auto-generated by the compiler.

All rules for valueness, as outlined previously, are readily enforced in this language context.

Ordinals

Ordinals are finite non-negative integral types, and provide a way to express statically sized and bounded objects. Despite their superficial resemblance to integers, ordinals are a special kind of enumeration type. They may be defined using the enum keyword: enum<3> is the ordinal type with members {0, 1, 2}. Ordinals have successor and predecessor operations (written "+++" and "---", respectively), can be compared by order (e.g. with "<"), and can be added or subtracted to each other (in which case the arithmetic is performed modulo the size of the ordinal).

Bounded Arrays and Value Arrays

There may be four different kinds of arrays: an array can either be mutable or immutable, and it can have either a statically fixed or dynamically determined size. An array with a statically fixed size is called a bounded array. Bounded arrays may be used to express fixed size components of value classes, as well as to describe the input and output rates of stream operators. Note that value arrays are part of the language of the present disclosure; bounded arrays are an additional feature that is extremely useful to the larger purpose of compiling directly to hardware; the purpose of this illustration is to show how readily the two can be combined.

As an example, a bounded array type is written with the bounding type inside of the square brackets, as for instance bit[enum<3>], which is a three-element array of bits. When the index type is an ordinal, as in this example, the type may be abbreviated as bit[3]. Since their indexing type is bounded, bounded arrays are immune from runtime array bounds indexing exceptions. This leads to more reliable code and reduces the need for exception logic in hardware.

The present disclosure also provides value arrays. Like value classes, value arrays are deeply immutable, meaning that the element types are themselves value arrays or value classes. As an example, value arrays are written with a double-bracket notation. For instance, an unbounded value array of int elements is written as int[[ ]].

Bounded and value arrays are used extensively in the definition of unsigned in the above Example Code 1. In that example, the only field of the class (line 3) is a bounded value array of bits. In this case, the bounding type of the array is the generic parameter N (generics are described in more detail below). There is also a constructor (line 7) which takes a mutable bounded array of bits, and uses it to create a new unsigned number. It uses the array constructor ("new bit[[[N]](data)"]), which takes the mutable bounded array and returns an equivalent immutable bounded array, which is then used to initialize the newly constructed object.

Bounded arrays are used in the definition of the "&" operator on lines 10-15. The bounded mutable array result is defined on line 11, and its elements are initialized on lines 12-13. On line 14, the constructor of line 7 is invoked to create a new unsigned value from the bits assembled in the result array.

User-Defined Operators

The methodology of the present disclosure, by enabling value classes, encourages a further language innovation allowing programmers to define the behavior of standard unary and binary operators as they apply to new types. In the present disclosure, basic operators associated with arithmetic and logical operations may be defined to bring object orientation down to the bit level and on a par with primitive types. As an example, the "&" operator for the unsigned<N> type, is shown on lines 10-15 in Example Code 1 above.

The following unary and binary operators can be user-defined:

~ ! +++ --- + - * / & | ^ % << <= ≤ ≤ = && || << >> >>> :: [ ]

The operators +++ and --- are the successor and predecessor operators. The range operator :: is explained below. Value types have compiler-generated equality operators that check for recursive value equality. Certain binary operators implicitly define their corresponding compound operator. For instance, the "+=" operator is implicitly defined when the "+" operator is defined. More subtly, the pre- and post-increment/decrement operators (e.g., x++) are defined by the definition of the "+++" and "---" operators, respectively.

Ranges

Ranges are a convenience feature to support iteration over subranges of value types (assuming the type provides the needed ordering operations). Examples include ordinals and value enums as well as all the integral primitive types provided by an OO language such as Java™.

The expression x::y has the type lime.lang.range<T> where T is the least upper bound type of x and y. The type range<T> implements the Iterable<T> interface from Java™, but is itself a value type. Ranges are thus usable in the "for-each" style loops introduced since Java™ 5 and also as values in their own right. Ranges are particularly useful in conjunction with the constructs .first and .last which resemble fields and apply to all bounded types (most notably, ordinals). Unlike ordinary fields, the .first and .last "special selectors" (also .size) are dispatched virtually through type variables. An example is line 12 of Example Code 1, which loops over the range of the ordinal N which is a type parameter.

Lime provides a special shorthand when the iteration is over the entire range of a value type. For example, the loop on line 12 of the example could have been written "for (N i)" (with the limits N.first and N.last implied).

Typedefs

Given that present disclosure enables (through the value classes) the definition of new "primitive types," it is convenient to be able to give those types short intuitive names, especially when the types are defined using generic types which tend toward verbosity. Thus, Lime provides typedefs similar in flavor to what are offered in the C language. An example is shown on line 18 of Example Code 1.

Semantically, a type definition is one step above a lexical macro and is substituted for the defined symbol prior to any other semantic analysis. However, the scoping and visibility for typedefs follows that for class definitions. Thus, the typedef in the example is public just as unsigned<N> is public (as a result, it should be in a source file of its own). Typedefs at package scope, class scope, and local scope are also possible.

Realization of Localness in Lime

As discussed above, the methodology of the present disclosure classifies methods into those that are pure functions, those that are stateful but isolated (receiving new information only as arguments and providing results only as return values), and those that have arbitrary side-effects. More precisely, a stateful isolated method is an instance method that may read and mutate all information reachable from the "this" instance. It may not read or mutate any other information, thus excluding all information reachable from static fields of any class. It may read, but not mutate, argument information. It may not retain a reference to its return value or anything reachable from it.

In Lime, the keywords "global", "local", and "glocal" are added as modifiers to method declarations. As a convenience to cover the most usual cases, the constructors and instance methods of a value class are local by default (though they can be declared "global" explicitly) and the all other methods and constructors are global by default (though they can be declared "local" explicitly),

---

Example Code 2 - Example of Local, Global, and Glocal Methods

```
1 public interface IRandom {
2     global int nextInt( );
3 }
4 public class Random implements IRandom {
```

Example Code 2 - Example of Local, Global, and Glocal Methods

```
5       public global int nextInt( ) {
6           return (int) System.nanoTime( );
7       }
8 }
9 public class PseudoRandom implements IRandom {
10      int nextValue = 17;
11      public local int nextInt( ) {
12          nextValue = nextValue * 317 + 9;
13          return nextValue;
14      }
15 }
16 public final value class
17      unsigned<N extends ordinal<N>> {
18          ...
19          static glocal unsigned<N> random(IRandom g) {
20              return new unsigned<N>(g.nextInt( ));
21          }
22 }
23 public class BoundedMap<K extends ordinal<K>, V> {
24      protected final V[K] mapping = new V[K]( );
25      ...
26      public glocal boolean contains Value(V val) {
27          for (K key)
28              if (val.equals(mapping[key]))
29                  return true;
30              return false;
31      }
32 }
33 class Test {
34      static final boolean repeatable = hasFoo( );
35      static local boolean hasFoo( ) {
36          var g = new PseudoRandom( );
37          var u = unsigned<32>.random(g);
38          var map = new BoundedMap<enum<20>,
39                      unsigned<32>>( );
40          map[enum<20>.random(g)] = u;
41          return map.containsValue(9);
42      }
43 }
```

Lime implements all of the checking rules for local, global and glocal methods as described in the earlier section on enforcement. To ensure full checking, the keywords can be applied equally to concrete and abstract methods (including the methods of interfaces). In Example Code 2 above, the interface IRandom provides a single method, nextInt( ), which generates a random integer. nextInt( ) is declared to be global, since that is the most permissive qualifier. There are two implementations: Random and PseudoRandom. The first implementation calls nanoTime( ) and therefore accesses global system state, and so the method is also declared global. However, the second implementation, PseudoRandom, uses a (very primitive for the purposes of illustration) deterministic function to generate a stream of pseudo-random numbers; therefore, its nextInt( ) method is declared to be local and can be called in any context.

Recall that one motivation was to determine when methods were pure functions. The rules for determining this property are as follows:

1. A local static method whose arguments are all value types is necessarily a pure function. It cannot communicate through static fields, it has no this argument, and its explicit arguments have no mutable instance fields.

2. A local instance method of a value type whose arguments are all value types is similarly a pure function. Although there is a this argument, that argument is a value too.

A second motivation was to determine when methods, though stateful, were isolated. This requires controlling the reachability of objects from instance fields. The desired property can be computed by first defining an isolating constructor as follows: a constructor is isolating if it is local and has only value arguments. Instances that are created with isolating constructors are guaranteed to have no aliases initially stored in their instance fields. Then, a method is stateful but isolated with respect to a particular instance if: the instance was created with an isolating constructor; and the method has only value arguments and a value return.

Note that pure functions may return non-values (since they cannot also store a reference to what they return) but returning a non-value from a stateful isolated function could break isolation by creating an alias. Stateful isolation with respect to a particular instance is useful when a task holds the only reference to the instance.

Repeatable Static Fields

Recall that a local method may read certain static fields deemed to be "repeatable." The concept of a repeatable expression is thus an extension of the concept of a compile-time constant expression (which in OO language such as Java™ is limited to primitive types). Repeatable expressions allow complex initialization of any value type with complex imperative code.

A static field is repeatable if it is recursively immutable (that is, a final field of value type) and all accesses to it during the lifetime of the computation will produce the same result.

The recursive immutability property avoids introducing new opportunities for side-effects. Repeatability is added to avoid the subtle requirement that would otherwise exist that all static final fields that are read by local methods must be initialized before those methods can be allowed to execute. It takes any non-determinism due to class loading order out of the equation, and it makes it substantially easier to relocate computations to hardware elements that lack a distinguished "class initialization" phase.

In the present disclosure, the only sources of non-determinism in a single thread are limited to global methods, such as System.nanoTime( ) in the example in Example Code 2. So, the repeatability property is obtained if the following properties hold in addition to recursive immutability.

1. The field must have an explicit initializer; that is, it may not be a "blank final" field with separate initialization in a static clause. This requirement is not strictly necessary but it simplifies compilation and facilitates program understanding.

2. Its initializer must be local. Since local so far only applies to methods, the way to think of this is as follows: if the initialize were prepended with the return keyword and terminated with a semicolon, the result could be (without error) the sole statement in a local static method with no arguments.

3. The field's initializer may not refer directly or indirectly (via other static variables) to the field itself (this would make the value dependent on the order in which classes are initialized).

Local/Global Polymorphism

Abstract methods (and more generally, methods "high" in the class hierarchy that are intended to be overridden) commit to being either local or global. In the present disclosure, a third option is provided, motivated by the following observation. The fact that local can override global but not vice versa would tend to favor using global for abstract or frequently overridden methods. But, the fact that global can call local but not vice versa favors making methods local whenever feasible so that they can be used in more contexts. Thus, a user designing a class hierarchy to be used in multiple contexts has a conflict if only those choices exist.

In fact, abstract methods which have, as yet, no actual behavior, can later be implemented in either a local or a global fashion, as in the IRandom class hierarchy of Example Code 2. But, simply declaring a "neutral" category would do no good by itself, since a conservative analysis would have to preclude calling any "neutral" method in a local context.

The present disclosure solves this problem with a context-dependent category, called glocal, with rules and a supporting static analysis that allows many calls to glocal methods to be treated as local calls. This promotes the more extensive use of local methods without compromising efficiency or re-usability.

The solution in the present disclosure is based on the observation that, for many methods, whether the method accesses global state is a function of its input arguments. For instance, Example Code 2, lines 16-22 show the random( ) method of the unsigned type. It is a glocal method that accepts a random generator of type IRandom. On line 37, unsigned's random( ) method is invoked with a parameter of type PseudoRandom, all of whose methods are local. Therefore, the present disclosure can treat the random( ) method as local in the calling context at line 37.

Glocal modifier exploits the greater information available at call sites by defining localizing calls and defining glocal methods so that calls to them are localizable. At the call site, a local method may only call a glocal method when all of its parameters are localizing. An actual parameter localizes a formal parameter when all of the accessible non-final instance methods of the formal parameter are overridden to be local in the static type of the actual parameter. When used in combination with generics, a call to a glocal method is localizing only when all of the generic parameters (as well as all of the method parameters) are localizing.

At the method definition, a glocal method has the same restriction as a local one in its access to static fields. In addition, 1. calling final global methods is prohibited (such a call can never be localized);
2. calling non-final global methods is prohibited except when (a) the receiver is a parameter of the method being defined, or (b) if its type is determined by a type variable (only calls indirected in such a fashion can hope to be localized);
3. calling other glocal methods is only allowed when it would be allowed for a global one by the previous rule or when such a call is localizing;
4. a glocal method may not override a local method and a global method may not override a glocal one (this ensures that the strongest necessary check is always performed at call sites).

In Example Code 2, unsigned.random( ) is a valid glocal method by rule 2(a): it calls a non-final global method of its parameter g of type IRandom. The call on line 37 is localizing because all methods of PseudoRandom are local.

The locality-polymorphism provided by glocal is also useful for generic classes, as shown in the fragment of the definition of the class lime.util.BoundedMap on lines 23-32. This class implements a mapping where the key is of an ordinal type, allowing a very efficient implementation with a fixed-size bounded array. The values held by the mapping, on the other hand, are of unconstrained type (type V).

Consider the implementation of the containsValue( ) method on lines 26-31: it iterates over the mapping array checking whether it contains the passed parameter val. It does this by calling the equals( ) method, which, since V is of unconstrained type, is considered to be Object.equals( ). Although it is considered good style for equals( ) to be a local method, it is not constrained as such (in particular, doing so may break Java™ compatibility). Thus the call to equals( ) on line 28 is not local, but it is localizable by rule 2(b). The call to containsValue( ) on line 41 is localized because the actual type of the generic parameter V is unsigned<32>, which is a value type whose equals( ) method is therefore guaranteed to be local.

The analysis that supports glocal may be conservative in two ways. First, flow analysis is not used to decide when a call is to a method's parameter: the simple name of the parameter is the receiver of the call. Second, all accessible non-final instance methods of a substituting type are local, regardless of which of those methods are actually called.

To maximize reuse, it is desirable that classes be usable in a local method, and as localizing parameters. In particular, the three overridable public methods of Object—equals( ), hashCode( ) and toString( )—should be local whenever possible. Since a value type causes all of these methods to become local, substituting a value type for the Object type is always localizing, for example, as with BoundedMap.

For non-values, the programmer takes care to ensure the same property holds wherever possible. A way to do so is to have a non-value class extend lime.lang.Mutable, rather than Object. The Mutable class provides local implementations of the three key Object methods. The equals( ) method simply uses the "==" method on its arguments (checking for object identity); the toString( ) method returns the class name appended with an "@" and the object's hash code, and the hashCode( ) method produces a hash code computed entirely from the immutable values of the fields of the object.

Note that the default Object.hashCode( ) method, as well as System.identityHashCode( ), are global methods. Because their values change unpredictably with each instance of an object, they cannot be used to create repeatable static fields. On the other hand, Mutable's hashCode( ) method can be used in computing a repeatable static.

Task Programming Model

The following describes task creation operator in one aspect. The present disclosure offers language features for expressing task, data, and pipeline parallelism. They are based on the creation of dataflow graphs that perform computation on streams of data. The approach exposes algorithmic data-locality and communication topologies to a compiler that can then decide on the best implementation choices depending on the target platform. A dataflow graph, also known as a stream graph, includes nodes that perform computation and edges that imply an exchange of data between connected nodes. In the present disclosure, nodes are tasks which read data from an input port, apply a worker method to the data, and commit the results to an output stream. A task's worker method is applied repeatedly as long as there are input data available on the port.

Figure 1:
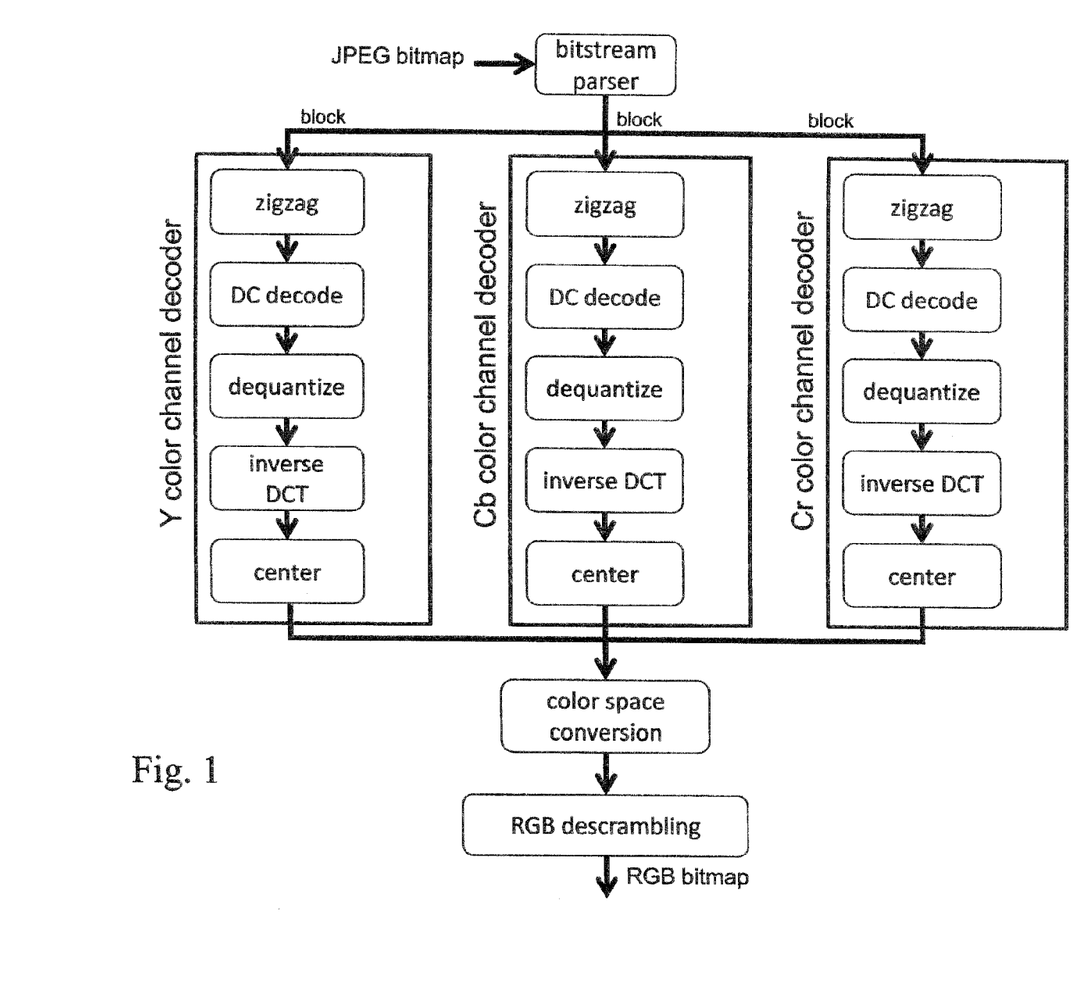
FIG. 1 illustrates an example stream graph of an example JPEG decoder.

An example stream graph is illustrated in FIG. 1. It describes the processing steps required to decode a JPEG image and convert it to an RGB bitmap. There are four processing stages: bitstream parsing, channel decoding, color space conversion and descrambling. The first stage parses an encoded string of bits to extract the decoding properties and the sequence of macroblocks comprising the image. A macroblock (mb) represents an 8×8 block of pixels from a particular color channel as a 64 pixel array. There are three color channels, one for luminance (Y) and two for chrominance (Cb and Cr). The parser produces a sequence of n macroblocks arranged as $(mb_1^Y, mb_1^{Cb}, mb_1^{Cr}) \ldots (mb_n^Y, mb_n^{Cb}, mb_n^{Cr})$.

Each of the macroblocks is channel decoded to reconstruct the original image. JPEG encoding is usually lossy hence the reconstruction is approximate. The channel decoding includes five steps: zigzag decoding, DC coefficient decoding, inverse quantization, inverse discrete cosine transform, and value centering. Each of these steps is a function $f$:block→block where block is a bounded value array of 64 pixel values (i.e., pixel[[64]]).

The channel decoding can be summarized using function composition as center∘iDCT∘deQuantize∘dcDecode∘zigzag.

which in an imperative programming style may be coded as shown in Example Code 3, lines 11-18. The decode method applies the five transforms sequentially for every given macroblock. Some of the transforms are stateless while others are not. The dcDecode in particular decodes the first pixel of each macroblock relative to the value of the corresponding pixel in a previous macroblock. Each of the transforms is carried out by a local method that produces a value which is immediately consumed by another method. The composition of methods in this way lends itself well to pipeline parallelism where each of the five methods is concurrently operating on different (but successive) macroblocks in the same color channel.

---

Example Code 3 - pseudocode for JPEG decoder
in an imperative programming style.

```
1  typedef pixel = unsigned<24>;
2  typedef block = pixel[[64]];
3  public class Channel {
4      static final Decode decode = new Decode( );
5      private final Coefficient dc;
6      public final Quantization q;
7      public Channel(Color c) {
8          dc = new Coefficient( );
9          q = new Quantization(c);
10     }
11     public block decode(block mb) {
12         return decode.center(
13             Transforms.iDCT(
14                 q.deQuantize(
15                     dc.dcDecode(
16                         decode.zigzag(mb)))),
17             128);
18     }
19 }
```

---

However, the introduction of pipeline-parallelism in an imperative language is intrusive, requiring the incorporation of buffering stages between method-calls or the use of other schemes that ultimately obfuscate the original implementation. This in turn leads to rigid implementations that are difficult to modify or tune for performance. The language semantics in an imperative programming model ensure eager evaluation and the resultant code dictates a specific execution order or schedule that may not be easily ported between architectures.

Figure 2:
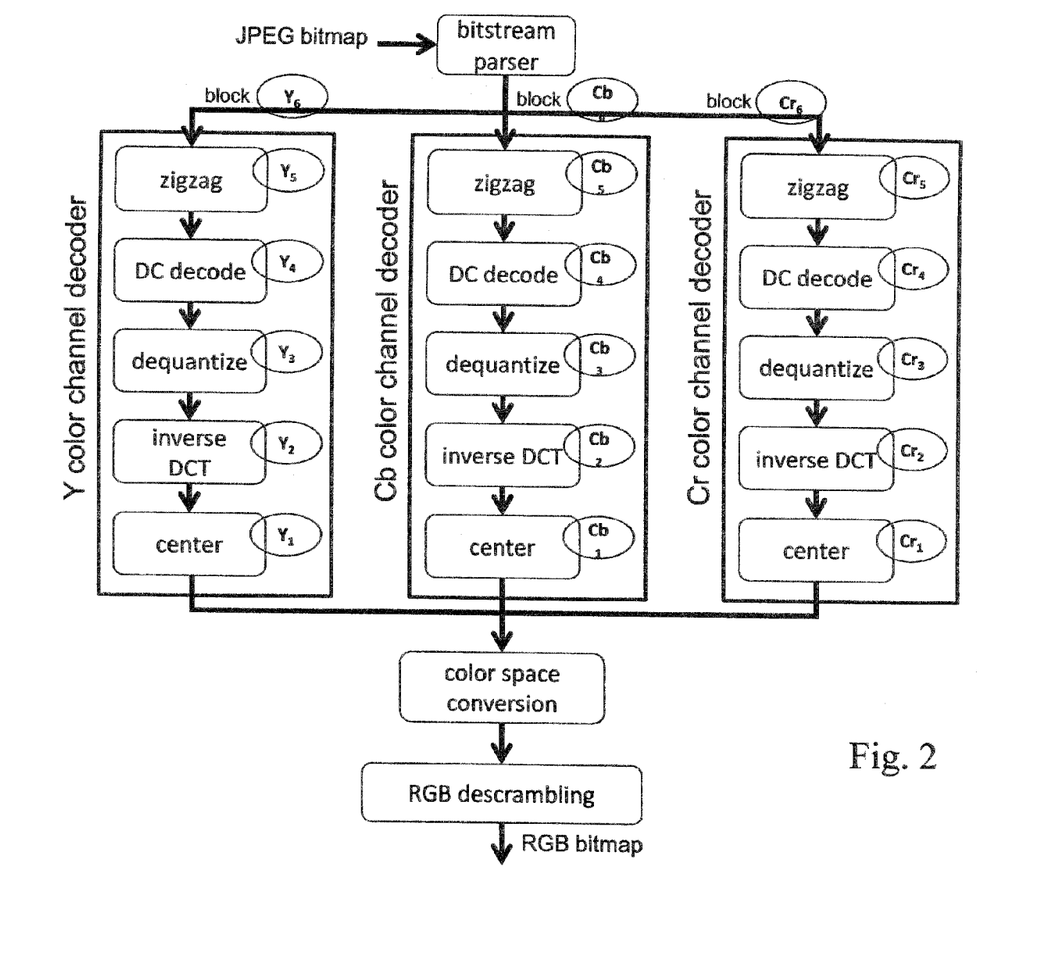
FIG. 2 illustrates pipeline and data parallelism in JPEG channel decoder example of FIG. 1.

The JPEG example affords opportunities for data parallelism as well, illustrated in FIG. 2. Data parallelism is readily apparent from the stream graph: each color channel decoder may operate on its corresponding macroblocks independent of the other decoders. In this case, threads could have been used to achieve coarse-grained parallelism. However, threads may be heavy-weight of an instrument for this purpose: in general it may be better to let the compiler or an independent scheduler decide how to assign computations to threads.

The present disclosure overcomes these challenges by introducing language features that enable lazy evaluation, encapsulate computation, abstract away communication, and provide strong isolation guarantees that make it feasible to realize scalable parallelism and to synthesize programs into custom hardware. The following description explain task programming using the JPEG decoder example to show how the task programming features of the present disclosure apply to that program.

Task and Connect

The methodology of the present disclosure in one aspect may facilitate the expression and discovery of coarse-grained parallelism by introducing the task and "=>" (connect) operators. These features free the programmer from specific implementation and performance details, and empower the compiler (and language runtime) with far more freedom in realizing high-performance executions for a wider range of architectures.

FIG. 2 illustrates pipeline and data parallelism in the above-described JPEG channel decoder example. Macroblocks are illustrated as circles. Each macroblock is labeled with the color channel it belongs to. Pipeline parallelism here refers to the concurrent processing of different macroblocks in a single color channel, and data parallelism refers to the concurrent processing of macroblocks from different color channels so while the left most pipeline is processing the Y blocks, the middle pipeline processes the Cb blocks and the right most pipeline processes the Cr blocks.

The task operator of the present disclosure creates an execution entity that reads data from an input port, applies a worker method to the data, and commits the results to an output stream. The port type is derived from the worker method's parameter list. Similarly, the stream type is the return type of the method. Methods with empty parameter lists or void returns can be used to create sources and sinks. The port is a tuple type if the number of arguments is greater than one, otherwise it is the type of the method's single argument.

The "=>" (connect) operator connects the stream (output) of one task to the port (input) of another. A connection between tasks can viewed as a double-ended queue with a task writing at one end and another reading at the other end. The language forbids connections between ports and streams that are already connected to avoid common programming errors or scheduling complications that may arise from simultaneous connections.

In a connection between tasks, the receiving port is of the same or wider type than the providing stream. If the types do not quite match but are compatible, the programming language provided by the methodology of the present disclosure provides an operator to match the data types.

The JPEG channel decoder pipeline for a single color channel can be expressed as follows in the present disclosure.

---

```
task Decode( ).zigzag
=> task Coefficient( ).dcDecode
=> task Quantization(component).deQuantize
=> task Transforms.iDCT
=> task Decode( ).center(block, 128)
```

---

The task operator constructs a new task whose worker method is bound to the method specified after the dot. The task worker method is invoked repeatedly as long as data are available on the task port. Methods in the programming language of the present disclosure are agnostic to their eventual use: a method may be used as a worker method in a task, or as a method invoked from an instance object. One can think of the task operator as supplying a system wrapper method that is aware of the task port and stream. The wrapper reads a number of data items from the input port, invokes the intended method using the appropriate parameters, and then writes the returned results to the output stream. The example illustrates the three ways of applying the task operator.

In general, the task keyword may be followed by the name of a static method, qualified by its signature to make the reference unambiguous. The Transforms.iDCT method is an example of task created from a static method.

Tasks with mutable state are created from non-value classes that provide an isolating constructor. The tasks constructed from the dcDecoder and deQuantize methods are examples of stateful tasks. The task operator in this case performs the equivalent of a new operation on the class using the isolating constructor, and then instantiates a task that executes the specified method for each value supplied on its input port. The task holds the sole reference to the object thus assuring that state is not shared between tasks. This eschews data races and non-determinism when executing tasks concurrently. The task creation expression for stateful tasks names both the isolating constructor and its arguments if any, as well as the instance method to be used, all in a single expression. Thus, task Quantization(component).deQuantize is thought of as a single grammatic production that cannot be broken up. Attempting to create a task from an already-instantiated object using a method that is not isolated as in the following is a compile-time error.

```
Quantization dq = new Quantization(component);
. . . => task dq.deQuantize      //error
```

Any isolated instance method of a value class may be used to create a task. The rules for task construction from value instance methods are the same as those for task creation from static methods except that the method or operator is associated with a specific value instance, as in

```
static final Decode decode = new Decode( );
...
return task decode.zigzag
=> . . .
=> task decode.center(block, 128);
```

The example above also illustrates constant task parameters, namely the pixel value 128 is bound as a constant second parameter to the center method. The missing parameters are specified by their type, and the supplied parameters are specified as expressions.

For generality, the methodology of the present disclosure may accept the form of task expression that is required for non-value instance methods for isolated methods as was shown in the example (task Decode( ).zigzag). This form of task construction also permits operators including user-defined operators of user-defined value classes and primitive types. The operator is one that is legal for the value, either because the value is of primitive type, or because it is a user-defined value type that implements the operator. The set of operators that can be used in this way are exactly the set of normally immutable operators that may be user defined except indexed assignment.

Task and connect expressions are a convenient and natural way of describing dataflow computation, compared to the imperative function composition paradigm. The former allows for a textual representation of the dataflow graph that matches the graphical representation whereas the latter does not. Another worthy property of task and connect expressions is that they simply direct the construction of dataflow graphs, but they do not cause any evaluation of the computation to occur. That happens when tasks are started. This two step process of establishing a dataflow graph and then later starting the evaluation is attractive because it decouples the expression of parallelism from its implementation, allowing not only the compiler but also the runtime to transform and refine the input dataflow graph into implementations suitable for the intended architecture. Task fusion—where pairs of connected tasks are fused into one—can lower communication costs and lead to more load-balanced implementations that are more efficient to run.

Filters and Isolation

Tasks with exactly one port and exactly one stream are called filters. User filters are constrained to produce one output value for each input value, but there are system filters that are not so constrained. The tasks that perform the channel decoding for a single color channel comprise a filter of port and stream type block. Filters have the type Filter<Tin extends Value, Tout extends Value> and hence we can define a filter-generating method equivalent to Channel.decode (Example Code 3, lines 11-18) as

```
Filter<block, block> decodeFilter(Color component) {
    return task Decode( ).zigzag
        => task Coefficient( ).dcDecode
        => task Quantization(component).deQuantize
        => task Transforms.iDCT
        => task Decode( ).center(block, 128);
}
```

Filters and most but not all tasks have the property that they are isolated from the rest of the system in that they only observe values via their ports and only generate values via their streams. Therefore, most tasks can not perform side-effects on other tasks or on the program heap. The exceptions are sources and sinks discussed below.

Filters satisfy one of two isolation properties: inherent isolation or sole-reference isolation. An inherently isolated task is constructed from a pure function whose return type is either a value or void. The methodology of the present disclosure recovers pure functions by composing valueness and localness as discussed above. Such tasks are stateless by definition. A stateful task on the other hand is sole-reference isolated. It is constructed from a stateful isolated method by adding the constraint that the task hold the sole reference to the isolated instance.

Sole-reference isolation works even if the class also defines global instance methods, because the local method will (by definition) not call global methods and isolation assures that no other code will either. Sole-reference isolation also works if the class has mutable public fields because, even if the chosen instance method accesses such fields, no other code will. Since the object starts with no aliases, the task holds the sole reference, and no non-values enter the worker method subsequently, no new aliases can be created. Task creation operations correspond to these different kinds of isolated entities.

Split and Join

In addition to filters, the present disclosure provides split and join system tasks to facilitate the expression of task and coarse-grained data parallelism. The split task, also known as a splitter, transposes a one dimensional stream into a multi-dimensional one. Specifically, a splitter inputs a stream of tuples and outputs the members of each tuple on the members of a tuple of streams. Similarly, a join task or joiner individually inputs values from the members of a tuple of streams and outputs a stream of tuples formed from those inputs.

The JPEG decoder offers an opportunity for data parallelism amongst the three color channel decoders: if the stream of macroblock tuples produced by the bitstream parser is transposed to produce three separate streams, then it is possible to apply a separate channel decoder filter to each stream. This is achieved in the present disclosure as shown in Example Code 4 below.

Example Code 4

```
1 var parser = . . . ; // task not shown
2 var filterY = decodeFilter(Color.Y);
3 var filterCb = decodeFilter(Color.Cb);
4 var filterCr = decodeFilter(Color.Cr);
5 var splitter = task split (block, block, block);
6 var joiner = task join (block, block, block);
7 parser
8 => splitter
9   => task [ filterY, filterCb, FilterCr ]
10 => joiner
11 => . . .
```

In Example Code 4, Lines 2-4 create the three independent filters, and lines 5-6 define the tasks that transpose the macroblock streams. The overall task graph can then be assembled using these building blocks as shown on lines 7-10. The splitter produces three separate streams each of type block. It is connected to a compound task including the three decoding filters. The compound task operator [ . . . ] constructs compound tasks from simple task types (i.e., task with one port and one stream). The compound task created on line 9 is such that each filter port connects in order to one of the splitter streams, and each of the filter streams connects in order to a joiner port. The output of the joiner is again a stream of '(block, block, block).

Splitters and joiners are reified by the following types which make it possible to create and save intermediate components of a task graph or to write utility methods that generate such components.

Splitter<Tin extends Value, Touts>
Joiner<Tins, Tout extends Value>

Instances of these types are created by the task split and task join operators as shown in Example Code 4. The argument to these operators is a splittable type, meaning a value type that is either a tuple or a bounded value array. The Touts type of a splitter and the Tins type of a joiner are derived such that a tuple type is split to a tuple of streams or joined from a tuple of ports, and a bounded value array type is split to a bounded (non-value) array of streams or joined from a bounded array of ports. Writing out the exact Splitter< . . . , . . . > or Joiner< . . . , . . . > types is tedious and normally avoided by using var.

Sources and Sinks

In addition to filters, the methodology of the present disclosure allows for Source and Sink tasks which need not be isolated. Such tasks are for performing I/O and other generally globally side-effecting operations.

The simplest form of a task is created from a simple value using the task operator followed by the value keyword and an expression that evaluates to a value (e.g., task value bit.zero). Such a construction results in a source task that produces an infinite stream of that value. Source tasks are parameterized types Source<Tout extends Value> and may be constructed directly from a value or from methods with no parameters.

Similarly, sinks are created from methods with void returns and have the type Sink<Tin extends Value>.

When a source or a sink actually is isolated, the getWorker method can be used to access the internal state of a task after it is no longer running. The method returns the object whose instance method is the task worker (or null if the work method is static) but only if the task is no longer running. An example of a sink task in JPEG decoder is the RGB descrambler which comprises the final stage of the decoding process. The descrambler writes the decoded macroblocks into a two-dimensional array of RGB pixels.

Example Code 5

```
1 typedef rgb = (byte, byte, byte);
2 class RGBDescrambler {
3     public rgb[ ][ ] bitmap;
4     public local void descramble(rgb[[64]] mb) {
5     . . .
6     }
7 }
8 Sink<rgb> sink =
9     task RGBDescrambler(. . .).descramble;
10 . . .
11 rgb[ ][ ] bitmap =
12     ((RGBDescrambler) sink.getWorker( )).bitmap;
```

The getWorker is used to access the results of the computation, namely the RGB bitmap in this case. Without such a method, the descramble method would have to perform I/O, meaning that it could not be local and would not be treated as isolated. Programmers of the programming language provided using the methodology of the present disclosure can use either isolated or non-isolated sources and sinks based on a convenience versus performance tradeoff.

Running and Terminating Tasks

The above description showed examples of tasks, created with the task operator. The operator returns a handle for the task. This handle is always a subclass of the type Task, such as Filter, Source, etc. The Task interface itself is not generic and has only methods related to running and terminating a task.

Typically, one starts a task by calling its start( ) method and awaits completing by calling rendezvous( ) which blocks the caller until the task is in the terminated state. Starting a task has the side effect of starting all the tasks connected to it and is the only way that one can start a closed graph with no open ports or streams. A task can also be started by calling get( ) or put( ) on an open stream or port. This also propagates to all connected tasks.

The start operation can throw an exception if the graph is found to be cyclic at the time it is started. The fact that explicitly cyclic graphs are illegal should not be taken as meaning that feedback within a graph is impossible. Such feedback employs the techniques of messaging.

Connecting a task in an already-started graph to another task causes the new task to be started as part of the running graph. Connecting two graph segments that were previously started is allowed (as long as no cycle is created). This action can cause both graphs to temporarily pause while a new schedule is calculated and then the resulting fused graph is restarted.

A task stops running when an uncaught exception of any kind occurs during the execution of the task worker method. By convention, tasks are expected to indicate "normal" termination by throwing Completion or one of its subclasses.

Task termination propagates in either an orderly or less orderly fashion depending on the reason for termination. If the task terminates due an explicit close( ) on one of its ports or due to throwing Completion or a subclass thereof, then termination is "orderly," meaning that there is an attempt to consume all queued values. If the graph has a single source and that task is the first to terminate, the graph drains as much data as possible before terminating.

If termination is caused by a Throwable that is not a Completion, the tasks of the graph are each stopped as soon as feasible, generally upon return from their current execution. This may leave data on some connections.

If more than one task terminates independently, before the propagation of termination from one reaches the other, or if an exception occurs while task is draining its port, the result is nondeterministic and generally follows the weaker guarantees of abrupt termination.

Figure 3:
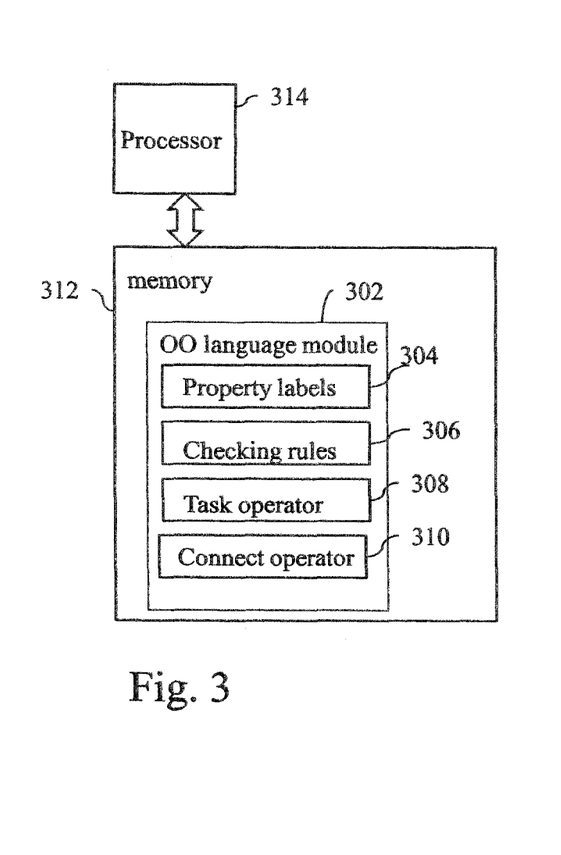
FIG. 3 is a system diagram illustrating components in one embodiment of the present disclosure.

FIG. 3 is a system diagram illustrating system components of the present disclosure in one embodiment. An object oriented programming language module 302 may include a plurality of property labels 304 for labeling functional and isolation characteristics of one or more methods and classes in a computer code. The object oriented programming language module 302 further may include one or more checking rules 306 supporting the plurality of property labels. The property labels may include valueness labels for object oriented language classes and localness for object oriented language methods. The valueness labels may include values, references, and universal labels as discussed above. The localness labels may include local and global labels, and optionally glocal labels as discussed above.

The object oriented programming language module 302 may further include a task operator 308 for transforming a plurality of methods in the computer code into a corresponding plurality of compute tasks. A connect operator 310 connects the compute tasks as to convert the plurality of methods into a dataflow graph. The object oriented programming language module 302 may further include the capacity to label the compute tasks as internally stateful or side-effect free based on the composition of valueness and localness properties as described previously.

The system may also include memory 312 where the object oriented language compiler may be stored and from where it may be executed by a processor 314.

Figure 4:
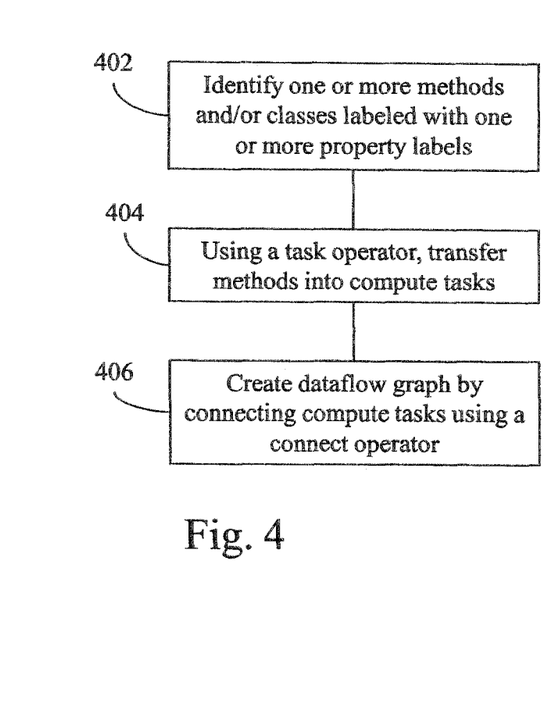
FIG. 4 is a flow diagram that illustrates method logic of the present disclosure in one embodiment.

FIG. 4 is a flow diagram illustrating a method of the present disclosure in one embodiment. FIG. 4 particularly illustrates an automatic process that may be performed in a computer or a processor executing the object oriented programming language compiler in one aspect of the present disclosure. At 402, one or more methods and classes in a computer code that are labeled with one or more of a plurality of property labels are identified. Property labels may include valueness and localness labels as discussed above. The valueness labels may include values, references, and universal labels. The localness labels may include local and global labels, and optionally glocal labels. The property labels may be used to specify functional and isolation characteristics in the computer code. Also, the property labels are supported by one or more checking rules discussed above. The plurality of property labels and the one or more checking rules supporting the plurality of property labels may be provided with a compiler of the object oriented language. A processor executing the object oriented programming language compiler extracts the methods identified with one or more of the property labels and applies the one or more checking rules to verify the functional and isolation characteristics in the computer code. In addition to the described properties and operators, the object oriented language of the present disclosure may include all or parts of a conventional object oriented language capabilities such as Java™. Moreover, programs written in the object oriented language of the present disclosure may be fully compatible with Java™.

At 404, the method may include transforming, by applying a task operator provided in the object oriented language, a plurality of methods in the computer code into a corresponding plurality of compute tasks. The compute tasks may be automatically labeled as internally stateful or side-effect free by the compiler of the object oriented programming language of the present disclosure. At 406, the method may also include connecting, by applying a connect operator provided in the object oriented language, the compute tasks to convert the plurality of methods into a dataflow graph.

A new language implemented using the methodologies presented in the present disclosure in one embodiment is designed be executable across a broad range of computer architectures. one or more executable programs generated or compiled by the new language are capable of executing on a broad range of computer architectures, from field-programmable gate arrays (FPGAs), reconfigurable functional unit (RFU), various other kinds of hardware function accelerators, to conventional central processing units (CPUs). Such code generated or compiled by the new language (i.e., a compiler of the present disclosure) may be capable of running or executing on non-standard hardware such as those that do not have an arithmetic logic unit (ALU) or other standard components. The language of the present disclosure may also allow for the convenient expression of various styles of parallelism: fine-grained parallelism can be expressed down to the bit-level since bits may be implemented as first-class objects, and "primitive" types with bit-level parallelism can be programmed directly in the language (e.g., 27-bit fixed-point numbers). Medium- and coarse grained pipeline and data parallelism can be expressed using new streaming primitives which compose individual tasks into computation graphs.

Fine- and medium-grained data parallelism can be expressed with collective and reduction operations on both built-in and user defined array and collection types. Note that this may include operations as fine-grained as performing a "not" operation across an array of bits. Streaming features are integrated into the language with the introduction of a task operator which can convert a method into a component in a stream computation graph. A connect operator then allows rich graphs to be composed from tasks. The run-time system then may handle buffering, partitioning, and scheduling of the stream graphs.

In one aspect of the present disclosure, the task operator of the present disclosure allows for the same method body to be able to be used in "function style" or "stream style", the distinction being whether the task operator is applied. Rather than provide explicit enqueue/dequeue operators, the present disclosure utilizes tuple and bounded arrays to express multi-input/multi-output operations, and a match operator to connect tasks with different data rates.

To expose functional properties and strong isolation within an imperative language, the system and/or methodology of the present disclosure relies on concepts of valueness, localness, and sole-reference isolation. Valueness or immutability may be declared using the value keyword to modify a type declaration. Localness may be declared using the local keyword which may be applied to any method declaration. It means that the method does not access mutable static fields (but may read certain final static fields). Sole-reference isolation indicates that only the task has a reference to the underlying object and hence any mutation of instance fields occurs as a result of the instance itself. These properties may be checked and verified. Using these properties, the system and/or methodology of the present disclosure may classify the world of objects into tasks that are provably functional and those that are mutable but sole-reference isolated. These properties afford a great deal of compilation flexibility in realizing efficient parallel implementations that eschews data races and implicit non-determinism.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may include both the program code written by the user and the program code that implements the compilation and checking described above. The user's code may be written in a statically typed object oriented programming language to which the extensions disclosed in the present disclosure have been added; the starting language may be any statically typed object oriented programming language, such as Java, C++, C# or the like. The compilation and checking may be written in any combination of one or more programming languages, including an object oriented programming language such as those just mentioned and conventional procedural programming languages, such as the "C" programming language or similar programming languages, a scripting language such as Perl, VBS or similar languages, and/or functional languages such as Lisp and ML and logic-oriented languages such as Prolog. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The systems and methodologies of the present disclosure may be carried out or executed in a computer system that includes a processing unit, which houses one or more processors and/or cores, memory and other systems components (not shown expressly in the drawing) that implement a computer processing system, or computer that may execute a computer program product. The computer program product may comprise media, for example a hard disk, a compact storage medium such as a compact disc, or other storage devices, which may be read by the processing unit by any techniques known or will be known to the skilled artisan for providing the computer program product to the processing system for execution.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The computer processing system that carries out the system and method of the present disclosure may also include a display device such as a monitor or display screen for presenting output displays and providing a display through which the user may input data and interact with the processing system, for instance, in cooperation with input devices such as the keyboard and mouse device or pointing device. The computer processing system may be also connected or coupled to one or more peripheral devices such as the printer, scanner, speaker, and any other devices, directly or via remote connections. The computer processing system may be connected or coupled to one or more other processing systems such as a server, other remote computer processing system, network storage devices, via any one or more of a local Ethernet, WAN connection, Internet, etc. or via any other networking methodologies that connect different computing systems and allow them to communicate with one another. The various functionalities and modules of the systems and methods of the present disclosure may be implemented or carried out distributedly on different processing systems or on any single platform, for instance, accessing data stored locally or distributedly on the network.

Figure 5:
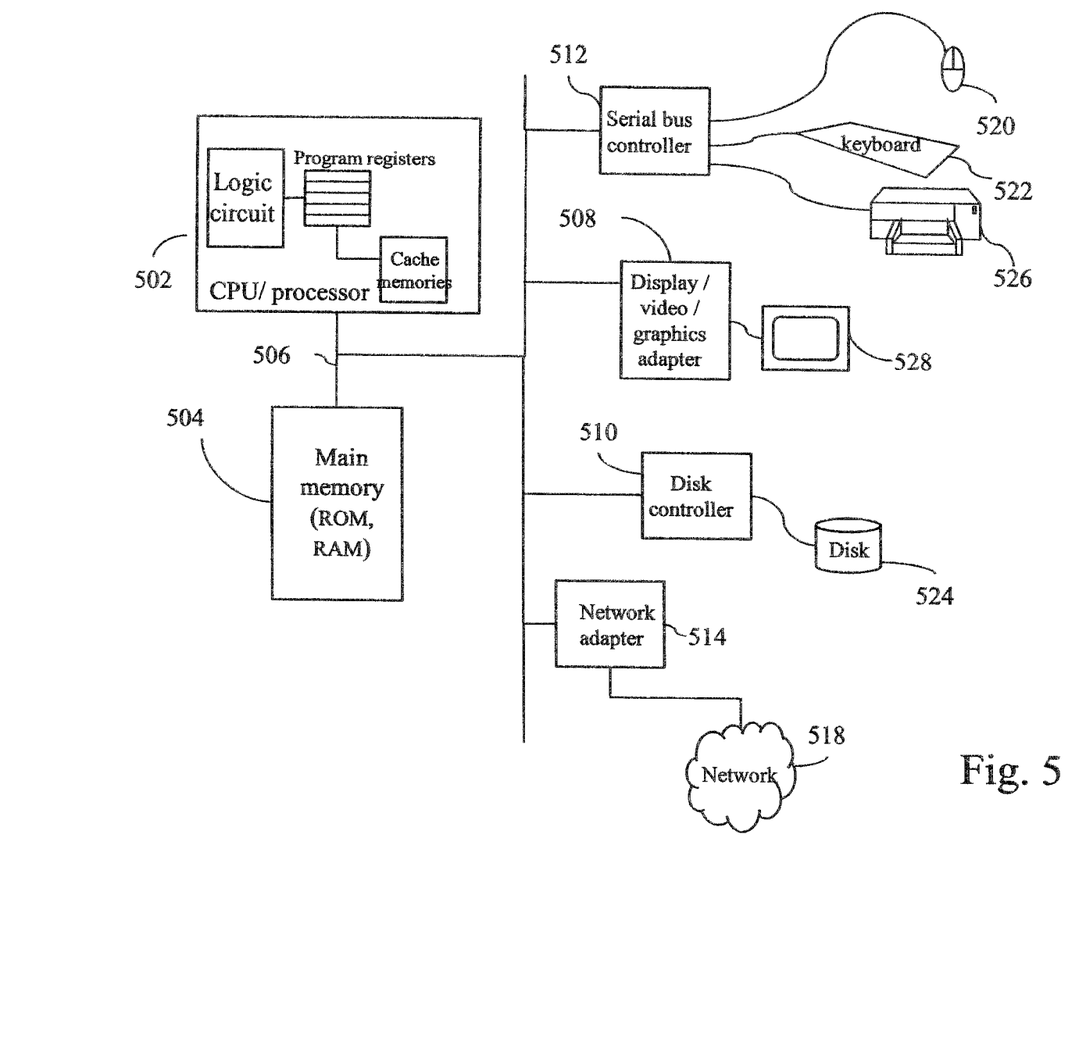
FIG. 5 illustrates an example of a computer system, in which the systems and methodologies of the present disclosure may be carried out or executed.

FIG. 5 illustrates an example computer system that may implement the system and/or method of the present disclosure. The illustration is only an example, and the present disclosure is not limited to any particular computer system or configuration. A computer may include, for example, one or more central processing units (CPUs) 502 which may include arithmetic/logic unit (ALU), fast cache memory and registers and/or register file. Registers are small storage devices; register file may be a set of multiple registers. Caches are fast storage memory devices, for example, comprising static random access (SRAM) chips. Caches serve as temporary staging area to hold data that the CPU 502 uses. Shown is a simplified hardware configuration. CPU 502 may include other combination circuits and storage devices. One or more central processing units (CPUs) 502 execute instructions stored in memory 504, for example, transferred to registers in the CPU 502. Buses 506, for example, are electrical wires that carry bits of data between the components. Memory 504 may include an array of dynamic random access memory (DRAM) chips, and store program and data that CPU 502 uses in execution. The system components may also include input/output (I/O) controllers and adapters connected to the CPU 502 and memory 504 via a bus, e.g., I/O bus and connect to I/O devices. For example, display/graphic adapter connects 508 a monitor 528 or another display device/terminal; disk controller 510 connects hard disks 524, for example, for permanent storage; serial controller 512 such as universal serial bus (USB) controller may connect input devices such as keyboard 522 and mouse 520, output devices such as printers 526; network adapter 514 connects the system to another network, for example, to other machines. The system may also include expansion slots to accommodate other devices to connect to the system. For example, a hard disk 524 may store the program of instructions and data that implement the above described methods and systems, which may be loaded into the memory 504, then into the CPU's storage (e.g., caches and registers) for execution by the CPU (e.g., ALU and/or other combinational circuit or logic). In another aspect, all or some of the program of instructions and data implementing the above described methods and systems may be accessed, and or executed over the network 518 at another computer system or device.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A method for extracting functional semantics and isolated dataflow from imperative object oriented languages, comprising:
    adding, to an object oriented language, property labels to methods and classes supported by a set of checking rules that verify an extraction of functional and isolation characteristics of the methods and classes;
    identifying, by a processor, one or more coded methods and classes associated with one or more of the plurality of property labels in a computer code written in said object oriented language to extract one or more of the functional and isolation characteristics in the computer code;
    applying, by a processor, the one or more checking rules to verify that the one or more coded methods identified with one of the plurality of property labels have isolation characteristics in said object oriented language,
    wherein the object oriented programming language further provides a task operator for transforming a plurality of methods in the computer code into a corresponding plurality of compute tasks, the task operator provided as a compiler keyword of the object oriented programming language,
    wherein the task operator is followed by a method identifier in the object oriented programming language,
    wherein the task operator performs construction of an object atomically with a creation of a task and returns a handle that enables a number of task operations without allowing direct object access to the object; and
    connecting, by applying a connect operator provided in the object oriented language, the compute tasks to convert the plurality of methods into a dataflow graph, the connect operator provided as a keyword in the object oriented language,
    wherein the dataflow graph represents a structure that can be executed and the compute tasks communicate only with other compute tasks in the graph, and only via explicit channels connecting them,
    wherein the compute tasks are identified as one or more of functional or isolated.

2. The method of claim 1, wherein the plurality of property labels and the one or more checking rules supporting the plurality of property labels are provided with a compiler of the object oriented language.

3. The method of claim 1, wherein the compute tasks are labeled as internally stateful or side-effect free.

4. The method of claim 1, wherein the plurality of property labels includes valueness labels for object oriented language classes.

5. The method of claim 4, wherein the valueness labels include one or more of values, references, or universal labels, or combinations thereof.

6. The method of claim 4, further comprising labeling all classes in the computer code written in object oriented language with a valueness property, the valueness property being labeled by at least one of the plurality of property labels.

7. The method of claim 1, wherein the plurality of property labels includes localness labels for object oriented language methods.

8. The method of claim 7, wherein the localness labels include one or more of local, global, or glocal labels, or combinations thereof.

* * * * *